April 26, 1932. R. J. BRITTAIN, JR 1,855,903
JOURNAL BOX AND TRUCK CONSTRUCTION
Filed Oct. 12, 1929 2 Sheets-Sheet 1

INVENTOR:
RICHARD J. BRITTAIN, JR.
BY
HIS ATTORNEY.

April 26, 1932. R. J. BRITTAIN, JR 1,855,903
JOURNAL BOX AND TRUCK CONSTRUCTION
Filed Oct. 12, 1929   2 Sheets-Sheet 2

INVENTOR:
RICHARD J. BRITTAIN, JR.
BY
HIS ATTORNEY

Patented Apr. 26, 1932

1,855,903

UNITED STATES PATENT OFFICE

RICHARD J. BRITTAIN, JR., OF BLOOMFIELD, NEW JERSEY, ASSIGNOR TO GENERAL MOTORS CORPORATION, OF DETROIT, MICHIGAN, A CORPORATION OF DELAWARE

JOURNAL BOX AND TRUCK CONSTRUCTION

Application filed October 12, 1929. Serial No. 399,352.

This invention relates to journal box and truck construction and comprises all the features of novelty herein disclosed. An object of the invention is to provide improved devices for mounting a car truck on a journal box. Another object is to provide an improved pedestal and journal box construction. Another object is to provide an arch bar truck with means for mounting the arch bars for tilting movement directly on the journal box. To these ends and to improve generally and in detail upon devices of this character, the invention also consists in the various matters hereinafter described and claimed.

In its broader aspects, the invention is not necessarily limited to the specific construction selected for illustrative purposes in the accompanying drawings in which Fig. 1 is a longitudinal vertical section on line I—I of Fig. 2.

Figure 1:
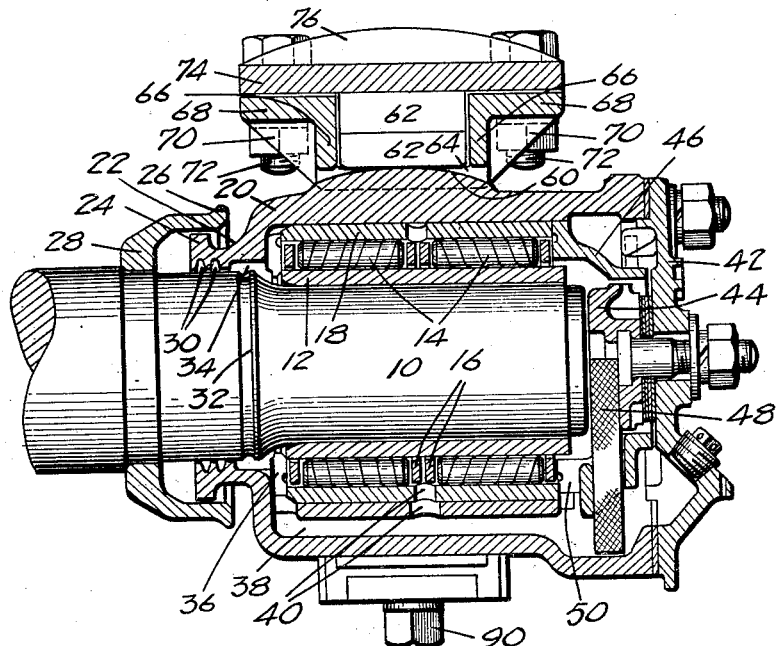
Figure 2:
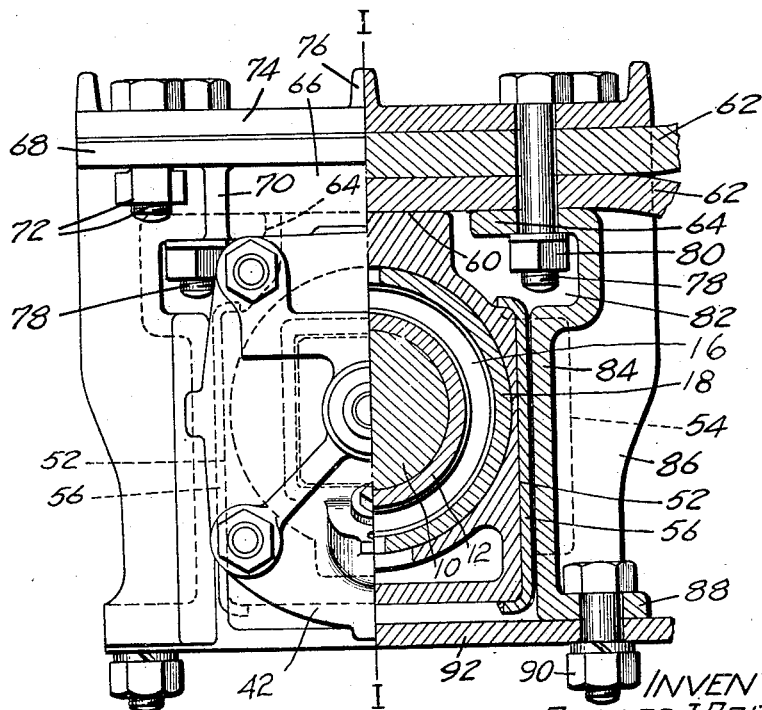
Fig. 2 is an end view of Fig. 1 with one half in cross section.

In Figs. 1 and 2, the numeral 10 indicates a shaft or axle carrying a raceway sleeve 12 receiving roller bearings 14 having end rings 16. The rollers run in an outer sleeve 18 contained in the bore of a housing herein shown as an axle box 20. At one end, the box has a peripheral drain groove 22 and an outturned end flange 24 enclosed by the flanged end 26 of a water guard whose hub 28 is pressed on the shaft against a shoulder. Grease grooves 30 at the end of the box make a close joint with the axle and creeping oil is arrested by a groove and rib 32 from which oil drains along a surface 34 through a slot 36 to a cored-out receptacle 38 at the bottom of the box. Openings 40 connect the receptacle 38 with the space between the bearings, and the outer end of the sleeve 18 is open to lubricant which thus has free access to the bearings at three locations. The oil is preferably maintained at a level with the lowermost rollers but the surging of the box will serve to agitate the lubricant.

The outer end of the box is closed by an end cap 42 having a thrust block 44 opposite to the end of the axle. A ring 46 is interposed between the end cap and bearings and surrounds the thrust block. The ring is provided with an opening for a lubricating wick 48 of felt or the like and has a notch 50 at the bottom to allow oil to drop from the end of the axle to the receptacle.

Figure 3:
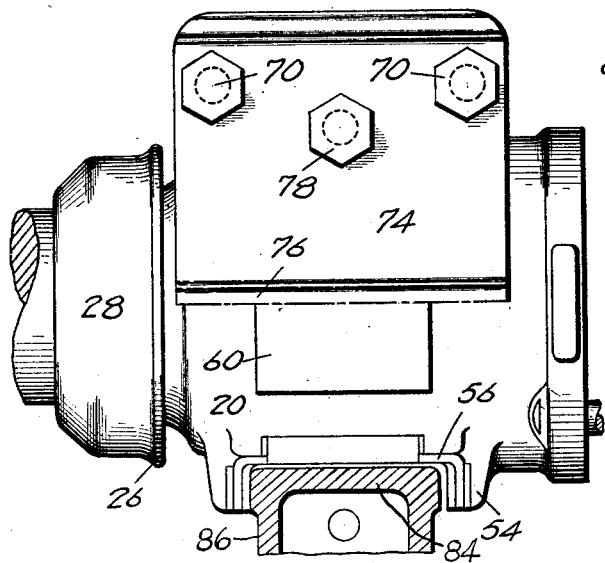
Fig. 3 is a plan view with portions of the pedestal structure cut away or in section.
Figure 6:
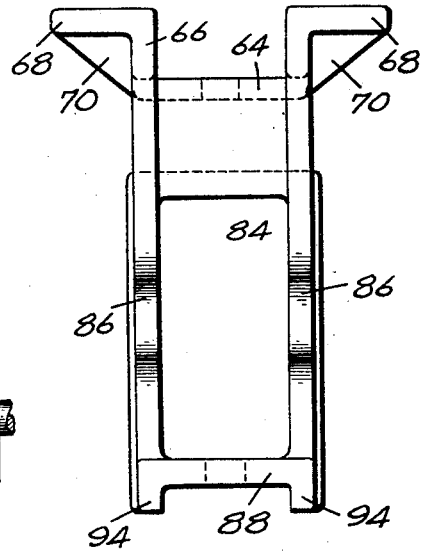
Fig. 6 is an end view of the pedestal.
Figure 4:
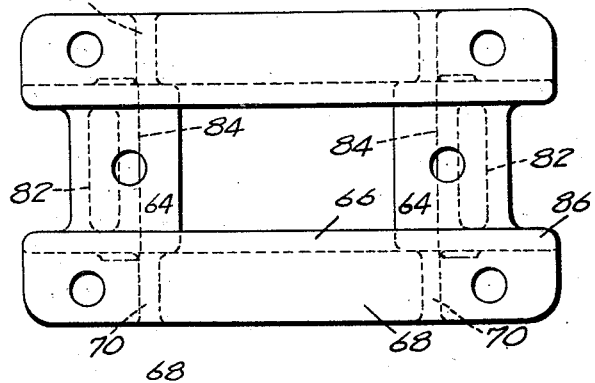
Fig. 4 is a plan view of the pedestal.
Figure 7:
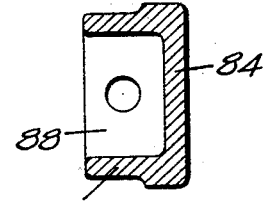
Fig. 7 is a section on line VII—VII of Fig. 5.
Figure 5:
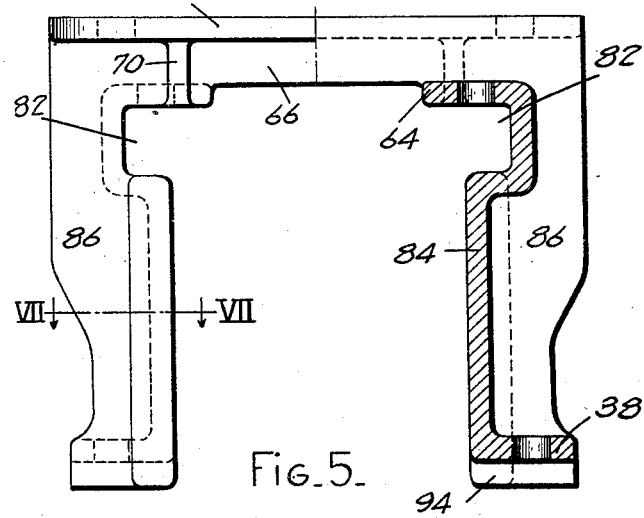
Fig. 5 is a side view of Fig. 4 with one half in section.

The box has straight side walls 52 and spaced flanges 54 forming pedestal ways which are protected from wear by U-shaped plates 56 whose upper and lower ends are bent over and welded, as indicated in Figs. 2 and 3, to the flanges 54 and to the box. The top of the box is provided with an upwardly extending projection having a bearing surface 60 which is preferably cylindrically crowned or curved longitudinally of the axle on a center of curvature at the level of the axle but offset a little inwardly with respect to the middle point of the roller bearings. The surface 60 has rocking or tilting engagement with frame members herein indicated as arch bars 62. The arch bars are clamped to a yoke or pedestal structure comprising cross webs 64 connecting spaced side walls 66 having outwardly extending side flanges 68 and bracing webs 70. The side walls extend upwardly to embrace the frame bars 62 and the cross webs are located at opposite sides of the box below its bearing surface 60. The clamping means comprises short bolts 72 connecting the flanges 68 with the ends of a clamping plate 74 having reinforcing ribs 76. Other bolts 78 pass through the arch bars and connect the plate 74 with the cross webs 64. Nuts 80 for the bolts 78 are received in offsets 82 of depending pedestal legs 84 which embrace the journal box between the pedestal flanges 54. The pedestal legs have side flanges 86 and cross webs 88 secured by bolts 90 to the usual tie-bar 92 of the truck, lugs 94 below the webs 88 embracing the tie-bar. The box flanges 54 and their wear plates are crowned so that the pedestal legs 84 and the box can have a relative tilting movement longitudinally of the axle. Mounting the truck frame bars 62 directly on the box brings the load close to the axle and reduces overall height of the pedestal structure.

I claim:

1. In a device of the character described, an axle box, an axle journalled in the box, a truck frame bar engaging the top of the box and movably mounted thereon to allow the box and frame member to have a relative tilting movement longitudinally of the axle, a pedestal structure having side walls embracing the frame bar and depending legs embracing the sides of the box, cross webs connecting the side walls, and means for securing the cross webs to the frame bar; substantially as described.

2. In a device of the character described, an axle box, an axle journalled in the box, a truck frame bar engaging the top of the box and movably mounted thereon to allow the box and frame bar to have a relative tilting movement longitudinally of the axle, a pedestal structure having side walls embracing the frame bar and depending legs embracing the sides of the box, cross webs connecting the side walls, means for securing the cross webs to the frame bar, and the legs having offset portions below the cross webs to receive the securing means; substantially as described.

3. In a device of the character described, an axle box, an axle journalled in the box, a truck frame bar engaging the top of the box and movably mounted thereon to allow the box and frame member to have a relative tilting movement longitudinally of the axle, a pedestal structure having side walls embracing the frame bar and depending legs embracing the sides of the box, cross webs connecting the side walls and engaging the frame bar, and a clamping plate extending across the frame bar and secured to the pedestal structure; substantially as described.

4. In a device of the character described, an axle box, an axle journalled in the box, a truck frame bar engaging the top of the box and movably mounted thereon to allow the box and frame member to have a relative tilting movement longitudinally of the axle, a pedestal structure having side walls embracing the frame bar and depending legs embracing the sides of the box, the side walls having outwardly extending flanges, and a clamping plate extending across the frame bar and secured to the outwardly extending flanges; substantially as described.

5. In a device of the character described, an axle box, an axle journalled in the box, a truck frame bar engaging the top of the box and movably mounted thereon to allow the box and frame member to have a relative tilting movement longitudinally of the axle, a pedestal structure having side walls embracing the frame bar and depending legs embracing the sides of the box, cross webs connecting the side walls and engaging the frame bar, the side walls having outwardly extending flanges, and a clamping plate extending across the frame bar and flanges, and means for securing the clamping plate to the flanges and the cross webs; substantially as described.

In testimony whereof I hereunto affix my signature.

RICHARD J. BRITTAIN, Jr.